United States Patent
Pontoppidan et al.

(10) Patent No.: US 7,353,048 B2
(45) Date of Patent: Apr. 1, 2008

(54) TRANSFORMER HINGE DESIGN

(75) Inventors: Morten Pontoppidan, Greve (DK); Giovanni Ferranti, Broenshoej (DK); Ricky Barnett, Radlett (GB)

(73) Assignee: Nokia Corporation, Espoo (FI)

( * ) Notice: Subject to any disclaimer, the term of this patent is extended or adjusted under 35 U.S.C. 154(b) by 813 days.

(21) Appl. No.: 10/323,822

(22) Filed: Dec. 20, 2002

(65) Prior Publication Data
US 2004/0203519 A1    Oct. 14, 2004

(51) Int. Cl.
*H04M 1/00* (2006.01)

(52) U.S. Cl. .............................. 455/575.3; 379/433.1; 16/256

(58) Field of Classification Search ............. 455/575.1, 455/575.3, 550.1; 379/433.01, 433.11, 433.13, 379/433.1, 428.01; 16/256, 273, 281, 283, 16/285, 286, 307, 316, 339, 342, 303, 330, 16/334, 365, 368, 371
See application file for complete search history.

(56) References Cited

U.S. PATENT DOCUMENTS

| | | | |
|---|---|---|---|
| 5,491,507 A | | 2/1996 | Umezawa et al. |
| 5,881,150 A | | 3/1999 | Persson |
| 5,936,530 A | * | 8/1999 | Meinhold ................. 340/573.1 |
| 5,966,776 A | * | 10/1999 | Ona ............................ 16/328 |
| 6,681,014 B1 | * | 1/2004 | Ghassabian .............. 379/433.1 |
| 6,757,390 B2 | * | 6/2004 | Ito et al. .................. 379/433.1 |
| 2002/0147026 A1 | | 10/2002 | Hsieh |
| 2004/0098834 A1 | * | 5/2004 | Lu et al. ........................ 16/337 |

FOREIGN PATENT DOCUMENTS

| | | |
|---|---|---|
| EP | 0907279 A2 | 4/1999 |
| EP | 0961459 A2 | 12/1999 |
| JP | 250215 | 2/1990 |
| WO | 03054672 | 7/2003 |

\* cited by examiner

*Primary Examiner*—Edward F. Urban
*Assistant Examiner*—Raymond S. Dean
(74) *Attorney, Agent, or Firm*—Alston & Bird LLP

(57) ABSTRACT

A mobile terminal having three parts rotatably interconnected by hinges. The terminal can be a mobile telephone having an operative position where a microphone and a loudspeaker are positioned for conversation. When not in operation, the terminal may be positioned around a user's wrist in a safe manner. Removing the terminal from the wrist requires operation of a release means or the overcoming of a predetermined force, which is a safety measure of the hinges and the terminal. The hinges provide a combination of snap or automatic rotation and freely selective rotational positions of the parts of the terminal.

15 Claims, 4 Drawing Sheets

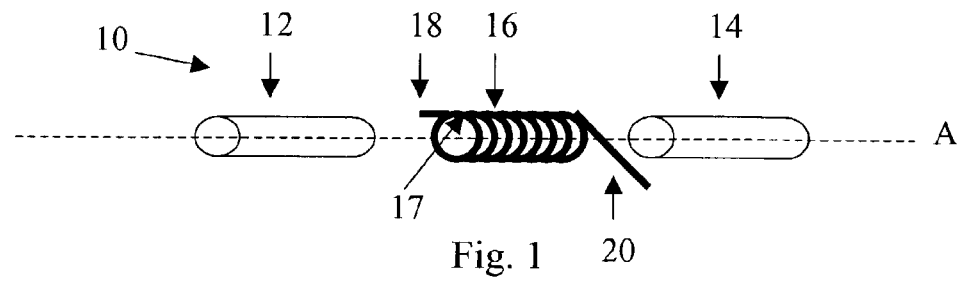
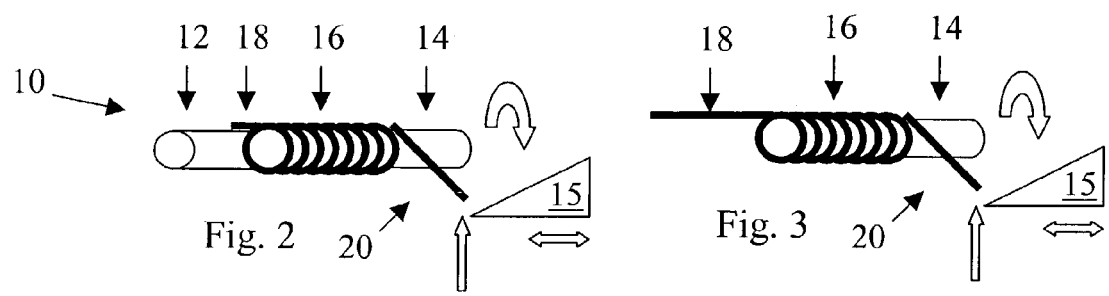
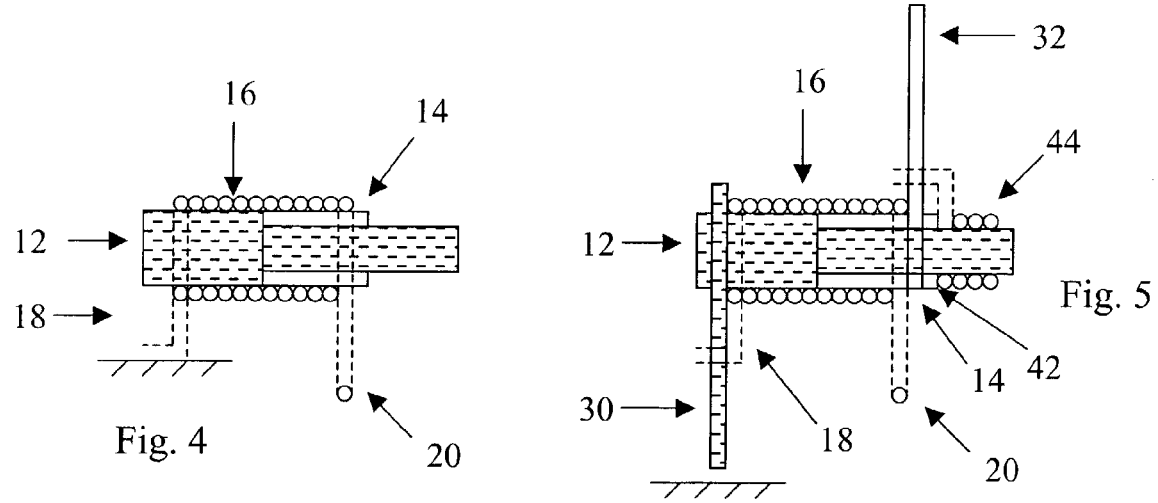
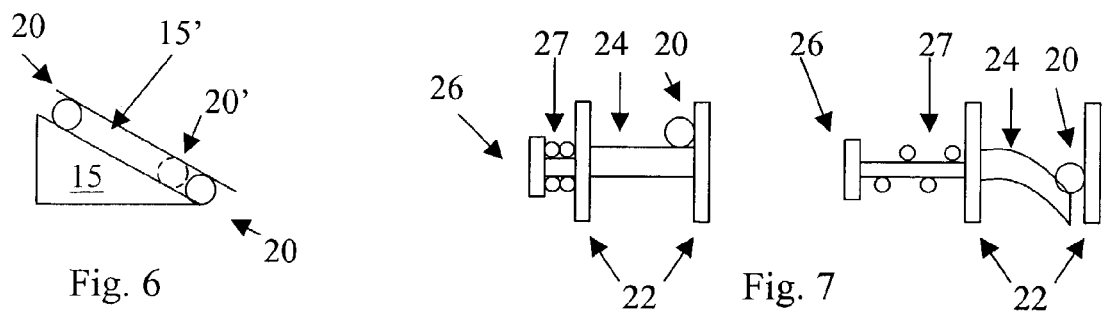

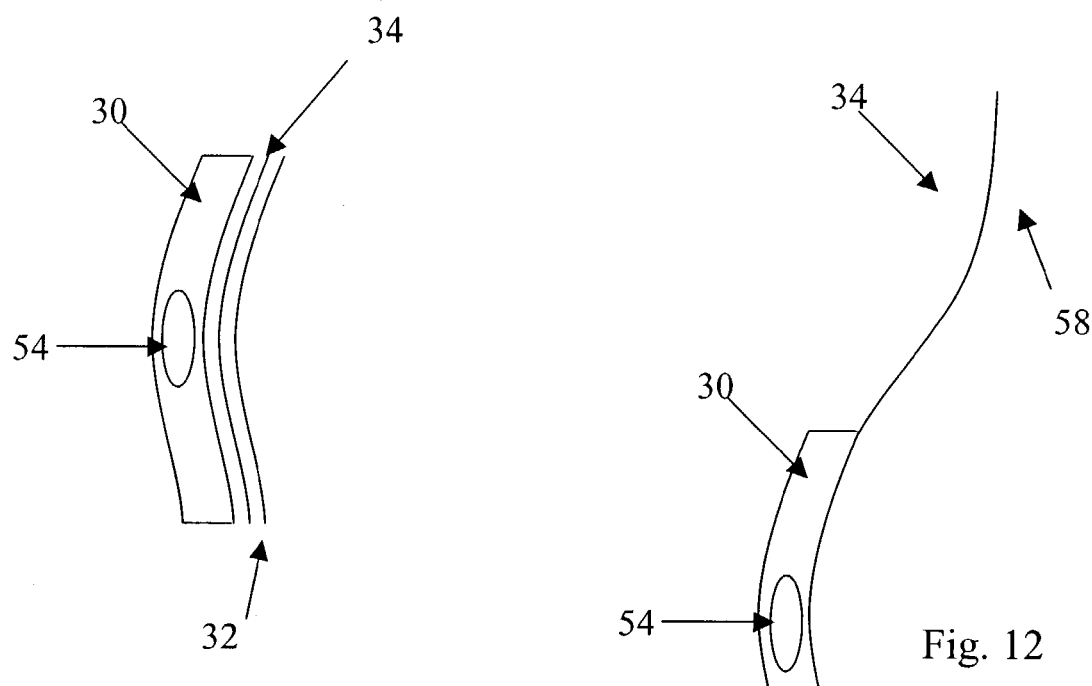
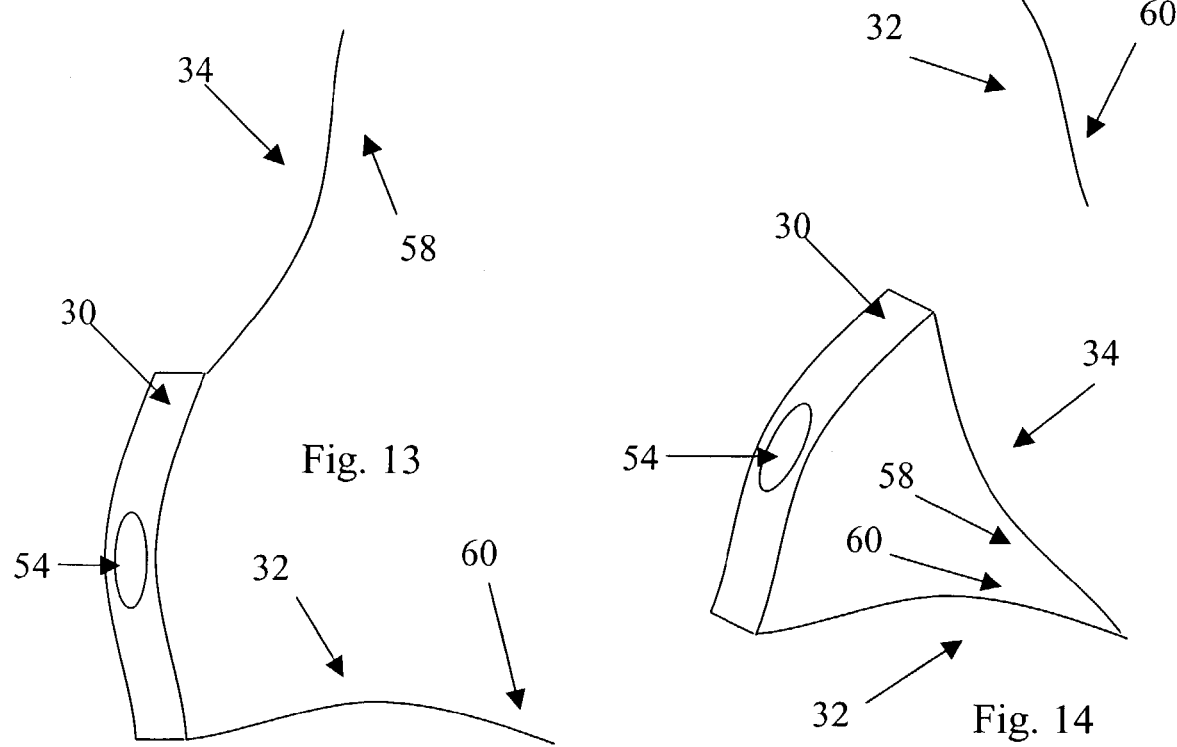

TRANSFORMER HINGE DESIGN

BACKGROUND OF THE INVENTION

1. Field of the Invention

The present invention relates to a mobile terminal and a method of operating the terminal, and more particularly to a mobile terminal having three parts rotatably interconnected, which terminal may obtain a number of positions and may e.g. be worn around a wrist of a person.

2. Description of Prior Art

A number of different manners of opening or unfolding foldable mobile terminals have been described. Most of these manners incorporate a biasing means for snapping the terminal open from a portable, inoperative position to an operative position. However, this biasing automatically makes it impossible for the telephone to obtain other positions between the inoperative and operative position. This makes positioning etc of the terminal difficult.

Also, when friction is deliberately provided in hinges of mobile terminals, normal clutches are provided generating the same friction in both directions of rotation.

Also, carrying of mobile terminals presents a problem in that these are relatively small and may become misplaced or difficult to find—especially when the user is stressed by e.g. the terminal prompting the person audibly.

SUMMARY OF THE INVENTION

The present invention addresses both problems and relates to, in a first aspect, a mobile terminal comprising a first, a second, and a third part, a first hinge pivotally interconnecting the first and second parts, and a second hinge pivotally interconnecting the second and third parts. Each of the first and second hinges includes:

- a helical spring having a longitudinal axis, the spring comprising one or more wound strands of material, each strand having two ends,
- a first hinge part extending into the helical spring, contacting an inner part of the helical spring at a first position or area along the longitudinal axis, and
- a second hinge part contacting the one or more strands of the helical spring at a position or area different from the first position or area, in each hinge, the spring facilitating that:
- rotation of the first hinge part in a first direction around the longitudinal axis and in relation to the second hinge part will provide a first, lower friction between the first hinge part and the helical spring, and
- rotation of the first hinge part in a second direction, being opposite to the first direction, around the longitudinal axis and in relation to the second hinge part, will provide a second, higher friction between the first hinge part and the helical spring, wherein:
- in the first hinge, the first hinge part is connected to or attached to one of the first or the second part of the terminal and the second hinge part is connected to or attached to the other of the first and the second part of the terminal,
- in the second hinge, the first hinge part is connected to or attached to one of the second or the third part of the terminal and the second hinge part is connected to or attached to the other of the second and the third part of the terminal, and the terminal further comprises, for each hinge, release means for increasing a diameter of the helical spring at the first position or area in order to reduce the second, higher friction between the first hinge part and the helical spring to a third friction during rotation of the first hinge part in the second direction.

In this context, it should be noted that the hinge may have other, more standard, hinge means, whereby the present helical spring assembly may mostly be used as a rotatable clutch of the hinge.

The first hinge part preferably has, at the part extending into the spring, an at least substantially circular cross section corresponding to an inner cross section of the spring. In that manner, contact inside the spring may be a contact along the inner circumference of the spring.

The contact of the second hinge part and the spring may be an attachment or a biasing, depending on which type of movement of the spring the second hinge part is to prevent or brake.

A standard helical spring is normally made of only a single strand or elongated piece of the material (typically a metal or another stiff material). However, springs are contemplated being formed by a number of strands, the windings of which are positioned, one after the other, along the longitudinal axis of the spring.

Also, the helical spring needs only be formed by part of the strand(s). The ends of the strand(s) need not be part of the helical spring. These ends may be used for different purposes, such as immobilization or actual movement.

The normal manner of providing a wrap spring clutch is to have the two hinged or clutched elements extend into the spring and thereby engage the inner part of the spring. However, it should be noted that the same effect may be obtained by reversing the operation and engaging the spring at an outer side thereof. Thus, in order to loosen the engagement, the spring is then not loosened (diameter increased) but tightened (diameter reduced).

In this context, the first hinge part would normally extend into the spring from one end thereof and engage the inner side of the spring (at least in the clutched operation) along a position and area from that end and a predetermined distance into the spring along the axis. However, the part needs not contact the spring at the end but may do so at any position thereof.

If both the first and second hinge parts extend into the spring, the first and second hinge parts engage or contact the spring at different positions or areas along the longitudinal axis of the spring. The first hinge part extends into the spring, but the second one may engage an outer surface thereof, an inner surface thereof—or actually a part of the strand(s) not being part of the actual helical shape of the spring. This will become clearer below.

It is clear that friction is a manner of keeping two elements in a predetermined position until a force is experienced large enough to overcome the friction, where after rotation is obtained.

Preferably, at least one of the first and second hinges comprises a biasing means for providing rotation of the first hinge part in the second direction when the release means are operated, the biasing means being adapted to provide a force exceeding a force required to overcome the third friction but being lower than a force required to overcome the second friction.

In this manner, the biasing means is not able to actually rotate the parts until the release means of the hinge is operated, whereby the second friction is reduced to the third friction. It is seen that the release thus provides a snap/ automatic movement of the pertaining parts of the terminal. However, the hinge provides, at the same time, a freely selected rotational position of the two parts in that the biasing or snap action is only provided when the release means is operated.

An especially preferred embodiment is one wherein:
the first hinge part of the first hinge is connected to or attached to the first part of the terminal,
the first hinge part of the second hinge is connected to or attached to the third part of the terminal, and
the release means of the first and second hinges are positioned in the second part of the terminal.

Thus, when this is the case, the first and third parts of the terminal can be rotatable in relation to the springs, the release means and the second part, which may then all be positioned in the second part. This makes the positioning and forming of the release means much easier.

Actually, in this situation, the release means are preferably adapted to be operated by a single operating means, such as a single button. Thus, both hinges may be released by the operation of a single button and using e.g. a single finger of a person.

A number of different embodiments may be used for the actual, wrapped spring clutch or the manner in which the spring is disengaged or loosened in relation to the first hinge part.

In one embodiment, the spring comprises a non-helical part at an end of each of the one or more strands, and the second hinge part only contacts the non-helical part. Thus, the second hinge part does not actually extend into the spring and/or engage the inner part thereof. In this embodiment, the contact between the second hinge part and the non-helical part of the spring may be an attachment. Preferably, the first hinge member contacts at least substantially a full inner surface of the spring and/or extends a full length of the helical part of the spring (in the direction of the axis).

In another embodiment, one end of each of the strand(s) of the spring is fixed in relation to the second hinge part and the release means is adapted to displace the other end(s) of the strand(s) from a first position to a second position.

One manner of obtaining this displacement is one wherein the release means comprises, for each hinge, a wedge-shaped element adapted to be translated and thereby displace the end(s).

Another manner is one wherein the release means comprises, for each hinge, a flexible element engaging the end(s), the end(s) being adapted to bias the flexible element into a first, deformed state when in the first position, and the release means comprising means for bringing the flexible element into a first, regular state and thereby bringing the end(s) into the second position. This may be obtained when the flexible element is hollow and wherein the means for bringing comprise a means adapted to be translated into the hollowness of the flexible element. These bringing means may be translatable into and out of the flexible element and may be biased in a direction out of the hollowness so as to ensure that the end returns to the first position and that engagement is obtained between the first hinge part and the spring.

The above-mentioned freely selectable rotational position may not be desired in both of the hinges. Also, it may be desired to actually ensure that an accidental operation of the release means does not bring about rotation. Thus, the terminal could further comprise locking means for maintaining the parts in a predetermined rotational angle even when the release means are operated.

When the mobile terminal is a mobile telephone, it is desired that one of the first, second, and third parts has a sound producer and that one of the first, second, and third parts has a microphone.

A preferred embodiment of such a telephone is one wherein both the first and the second hinges comprise biasing means for biasing the first and the third parts of the terminal toward predetermined rotational positions, respectively, in relation to the second part of the terminal, and wherein the sound producer and the microphone are accessible at a predetermined side of the terminal, when the first and third parts of the terminal are in the predetermined rotational positions in relation to the second part of the terminal.

Normally, the first, second, and third parts of the terminal will have an at least relatively flat shape where the axes of rotation of the hinges will be in a plane of the flat shapes. In this manner, normally, the predetermined side will be a side having the flat sides of the parts of the terminal.

In another aspect, the invention relates to a mobile terminal comprising:
a first, a second, and a third part,
a first hinge pivotally interconnecting the first and second parts so that the first and second parts are adapted to be rotated between a first, lower angle between the first and second part and a second, higher angle, and
a second hinge pivotally interconnecting the second and third parts so that the second and third parts are adapted to be rotated between a third, lower angle between the second and third part and a fourth, higher angle, wherein:
one of the first, second, or third parts of the terminal has a microphone,
one of the first, second, or third parts of the terminal has a sound emitter, and
the terminal has an operative position wherein:
the first part is rotated to the first, lower angle,
the third part is rotated to the fourth, higher angle, and
the microphone and sound emitter are accessible from a predetermined side of the terminal.

In this context, the angle between two parts is determined in a plane perpendicular to the axis of rotation and in a predetermined direction (clockwise or counter clockwise) around the axis. One manner is to determine the angle between two predetermined points or parts of the parts.

Also, the operative position is preferably a position in which the terminal may be used for making telephone conversations. Other positions may be more suitable for data transmission/receiving/entering or outputting to the user.

In a preferred embodiment, a largest, combined length of the first, second, at third parts in a direction perpendicular to the longitudinal axes exceeds half the circumference of a wrist of a user of the terminal. However, in that situation, the terminal, in a position where it has a largest linear length, in a plane perpendicular to the axes, might seem unnecessary long for use as e.g. a mobile telephone. Therefore, preferably, the terminal also, in the operative position, has a largest linear length, in a plane perpendicular to the longitudinal axes, being lower than the largest, combined length. Thus the folding of the terminal. In this embodiment, preferably a length of each of the first and the third parts is at least substantially as long as the widest part of the wrist in order for the terminal to get a suitable grip of the wrist when positioned there.

Also, in order to obtain a suitable operative position and grip of the wrist, preferably:

the first, lower angle is lower than 45 degrees,
the second, higher angle exceeds 90 degrees,
the third, lower angle is lower than 110 degrees, and
the fourth, higher angle exceeds 110 degrees.

In fact, preferably, the first and second parts are positioned adjacently to each other in the operative position. Adjacent meaning that the angle is preferably as small as possible taking into account the shapes of the first and second parts. Preferably, the microphone is positioned in the third part, and the sound emitter is positioned in the first part.

In a highly preferred embodiment:
the first hinge has a biasing means adapted to bias the first part, relative to the second part, in a direction toward the first, lower angle, and
the second hinge has a biasing means adapted to bias the third part, relative to the second part, in a direction toward the fourth, higher angle, the terminal further comprising releasable means for maintaining the first and third parts, relative to the second part, in at least one position rotated at an angle to the first and fourth angles, respectively.

Thus, in this manner, the terminal or telephone is provided with the above-described snap movement brought about when the releasable means are operated.

Preferably, each of the first and second hinges comprises:
a helical spring having a longitudinal axis, the spring comprising one or more wound strands of material, each strand having two ends,
a first hinge part extending into the helical spring, contacting an inner part of the helical spring at a first position or area along the longitudinal axis, and
a second hinge part contacting the one or more strands of the helical spring at a position or area different from the first position or area, in each hinge, the spring facilitating that:
rotation of the first hinge part in a first direction around the longitudinal axis and in relation to the second hinge part will provide a first, lower friction between the first hinge part and the helical spring, and
rotation of the first hinge part in a second direction, being opposite to the first direction, around the longitudinal axis and in relation to the second hinge part will provide a second, higher friction between the first hinge part and the helical spring, wherein:
the releasable maintaining means comprise, for each hinge, release means for increasing a diameter of the helical spring at the first position or area in order to reduce the second, higher friction between the first hinge part and the helical spring to a third friction during rotation of the first hinge part in the second direction,
in the first hinge:
the first hinge part being connected to or attached to one of the first or the second part of the terminal and the second hinge part being connected to or attached to the other of the first and the second part of the terminal,
the helical spring being adapted to have a rotation in the second direction be a rotation from the first, lower angle to the second, higher angle, and
the biasing means being adapted to provide a force exceeding the first, lower friction, and
in the second hinge:
the first hinge part being connected to or attached to one of the second or the third part of the terminal and the second hinge part being connected to or attached to the other of the second and the third part of the terminal,
the helical spring being adapted to have a rotation in the second direction be a rotation from the third, lower angle to the fourth, higher angle, and
the biasing means being adapted to provide a force exceeding the third friction but being smaller than a force required to overcome the second friction.

In this manner, the advantage of the hinges is brought into the terminal so that both the advantageous operative position is obtained and the advantageous snap operation and the user selectable positioning are obtained.

The advantage of the above highly preferred embodiment may be seen in a third aspect of the invention relating to a method of operating this embodiment, the method comprising, in sequence:
1. activating the maintaining means so as to have the biasing means rotate the first and third parts in relation to the second part for the terminal to obtain the operative position,
2. operating the terminal,
3. while activating the maintaining means, positioning the three parts of the terminal around a wrist of a person.

Thus, the terminal may be worn around the wrist of a person after operation. In fact, preferably, step 1. of the method comprises, while activating the maintaining means, removing the terminal from the person's wrist. Also, subsequently to step 3., the method preferably comprises releasing the maintaining means and tightening the first and third parts around the wrist.

Operation of the terminal may be any operation of mobile terminals, such as telephone conversations, playing games, calendar lookups, SMS/MMS, recording pictures, sound, transmitting or receiving data, such as pictures, text and/or sound, etc.

It is seen that the direction of the springs provides a terminal, which may be tightened around the wrist in a manner so that removal requires either, the overcoming of the second friction (a safety measure) or the operation of the release means. Operating the release means automatically, due to the biasing means, brings about the operative position of the terminal, such as when receiving a telephone call or when wishing to make one.

BRIEF DESCRIPTION OF THE DRAWING

The invention will be explained more fully below, by way of example, in connection with preferred embodiments and with reference to the drawing, in which:

FIG. 1 illustrates the parts of a first embodiment of a clutch/hinge,

FIG. 2 illustrates the parts of FIG. 1 assembled to the hinge,

FIG. 3 illustrates a different embodiment of a hinge,

FIG. 4 is a cut-through view of yet an embodiment of a hinge,

FIG. 5, is a cut-through view of the hinge of FIG. 4 now also having a biasing spring, FIG. 6 illustrates one manner of loosening the helical spring, FIG. 7 illustrates another embodiment of a manner of loosening the helical spring, FIGS. 11-14 illustrate different positions of an embodiment different from that of FIGS. 9 and 10.

DETAILED DESCRIPTION OF THE INVENTION

Figure 8:
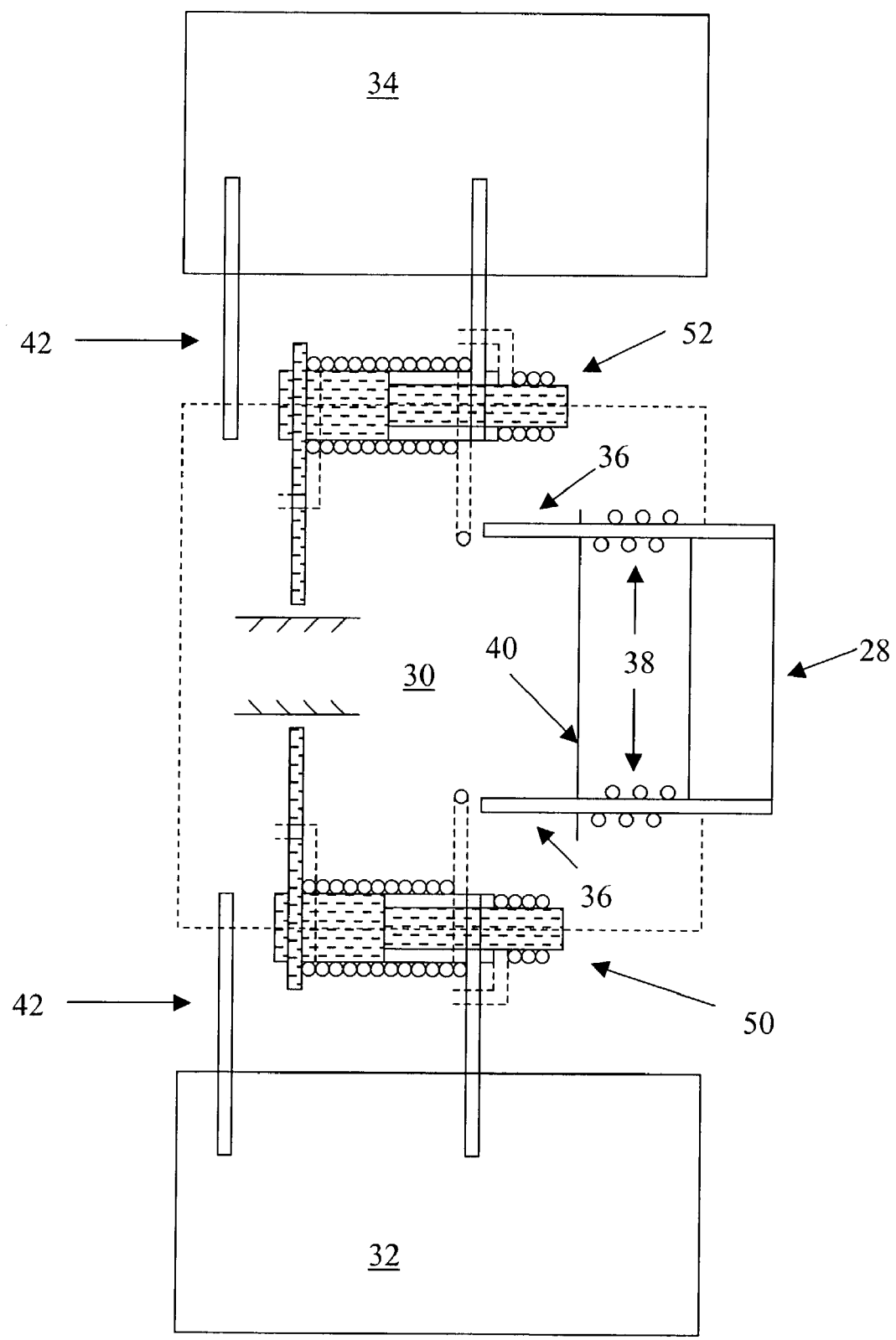
FIG. 8 illustrates a system having three parts, two hinges as seen in FIG. 5 and a central spring loosening means.

FIG. 1 illustrates the basic elements of a known wrap-spring clutch/hinge. This hinge 10 comprises two rod members 12 and 14 and a helical spring 16 having an internal surface 17 and two strand ends 18 and 20. The diameters of the rod members 12 and 14 are larger than the internal diameter of the spring 16.

This hinge is assembled in FIG. 2 where the rod members touch inside the spring 16. It is clear that if the end 18 is kept fixed in relation to the rod member 12, rotation of the rod member 14 in the direction of the arrow will tighten the spring 16 and thus lock the two rod members 12 and 14 to each other so as to obtain maximum torque. In that manner, torsion or rotational energy is transferred from rod member 14 to rod member 12. On the other hand, if the rod member 14 was rotated in the other direction (opposite to the arrow), this movement will only loosen the spring 16, whereby almost no torque is transferred.

Also illustrated in FIG. 2 is a wedge 15 which may be used for moving the end 20 of the spring 16. If the wedge is moved so as to lift (on the figure) the end 20, the spring 16 will be "loosened" which means that the internal diameter thereof will increase so that the rod member 14 may now be moved in the direction of the fat arrow without tightening the spring 16 and transferring torque to the rod member 12.

In that manner, rotation of the member 14 in the direction of the fat arrow, around the longitudinal axis A, without operating the release wedge 15, a high friction is obtained due to the fact that the spring 16 will tighten. Rotation in the opposite direction of the member 14 will, on the other hand, incur a much lower friction due to the spring 16 loosening. Also, when operating the wedge 15, a third, low friction is experienced when rotating the member 14 in the direction of the fat arrow.

In FIG. 3, a different embodiment is illustrated which also has the rod member 14 and the spring 16 with the ends 18 and 20. However, the rod member 12 has been removed, and instead the element hitherto connected to the rod member 12 is attached to the end 18. As described above, this embodiment has certain advantages to the embodiment where the rod members abut in the spring 16. Preferably, the rod 14 now extends throughout the whole of the helical spring 16.

FIG. 4 illustrates another embodiment of a hinge having the same function. This hinge also has a first rod member 12, the second rod member 14—now in the form of a tubular element extending over part of the rod member 12. The spring 16 has the "unlocking end" 20 and the end 18, which is now fixed to a fixed element.

In FIG. 5, the hinge of FIG. 4 has been added elements 30 (fixed to the rod member 12 and in which the end 18 is fixed) and 32 (fixed to rod member 14) as well as a locking element 42 preventing the spring 16 from moving into a space between the rods 12 and 14 and creating backlash etc. in the system. It is seen that instead of immobilizing the end 18, the element 30 may be immobilized. Also, a biasing spring 44 is added having one end attached to the element 32 and the other (not illustrated) fixed to the rod member 12. Thus, it is clear that the element 32 and rod member 14 may be rotated over the rod member 12, this movement being biased by the biasing spring 44.

In this respect, it is preferred that the fixed end 18 and the wedge 15 (see also FIGS. 6 and 7) exist in the same system—meaning that these elements are not rotatable (but may be translatable) in relation to the rod member 12 or element 30. This will become clear from FIG. 8.

A number of choices exist when assembling the present hinge. Either the spring 16 is slightly opened before introducing the rods 12 and 14 (when the outer diameter of the rods is larger than the inner diameter of the spring) so as to obtain an engagement or friction there between in the un-operated situation, so that operation may be a loosening of the spring 16. Alternatively, it may be desired to actually bias the end 20 in the un-operated situation (when the outer diameter of the rods is smaller than the inner diameter of the spring), so that operation may be a tightening of the spring 16. In either way, it may be desired to bias the end 20 in the "tightening" direction in the un-operated situation.

FIGS. 6 and 7 illustrate different manners of actually loosening the spring 16. In FIG. 6, the wedge 15 is illustrated together with two different positions of the end 20 of the spring 16. Depending on the distance between the wedge 15 and the helical part of the spring 16, this movement of the end 20 will provide more or less loosening of the spring 16.

In FIG. 6, the wedge 15 is supplemented by another element 15' forming, together with the wedge 15 a track in which the end 20 travels. This track may be used for actually biasing the end 20 in the tightening direction. This operation is seen as the un-biased position of the end 20 is illustrated by a dotted end 20'. Thus, moving the end 20 upwards will loosen the spring, and in the un-operated position, the end 20 is that depicted at the lower position, which is lower than the unbiased position 20'.

Another manner is seen in FIG. 7, where the end 20 rests against a flexible element 24 inside which an elongated, stiff element 26 may slide. It is seen that the end 20, in fact, is biased against the element 24 in such a manner that when the element 26 is retracted, the end 20 will deform the element 24 and thereby tighten the spring 16.

The element 26 is biased away from and out of the element 24 by a biasing spring 27, and the elements 26, 24 and 20 are controlled by holding means 22.

Returning to FIG. 2, it is clear that loosening of the spring 16 may be performed by moving the spring end 20 in a number of ways, such as in the direction of the fat arrow or in a direction along the end 20 toward the spring 16.

FIG. 8 illustrates a three-part system having a second part 30 connected via a first hinge 52 to a third part 32 and via a second hinge 50 to a first part 34. The reference numerals from FIG. 5 have been omitted in order to retain the clarity of the figure.

The actual "direction" of the hinges (that is, the high friction and low friction rotation directions and the directions of the biasing springs) will be described in relation to FIGS. 9 and 10.

The part 30 of the system of FIG. 8 has a spring loosening mechanism having a push button 28 connected to two loosening mechanisms 36, such as the wedge 15, and being biased by two biasing springs 38 engaging a fixed element 40 in the part 30.

It is seen that this loosening mechanism loosens both springs 16 at the same time. Alternatively, separate loosening mechanisms may be made for each hinge.

Both the first and third parts are further rotationally attached to the second part by elements 42. This is only to stabilize the rotation of the parts.

Figure 9:
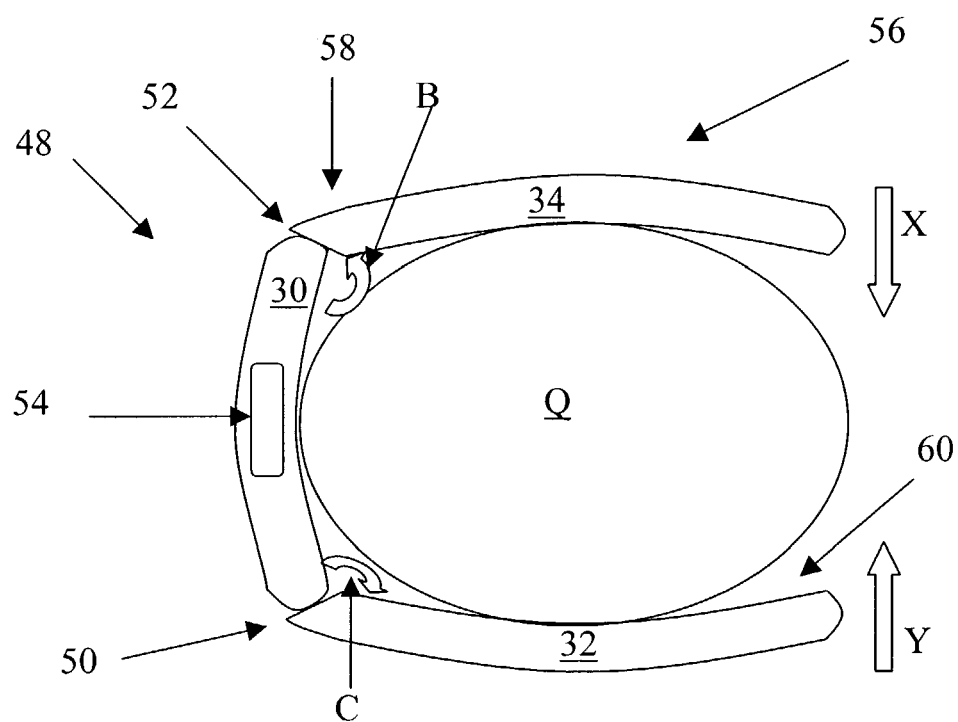
FIG. 9 illustrates a three-part system in a first position.
Figure 10:
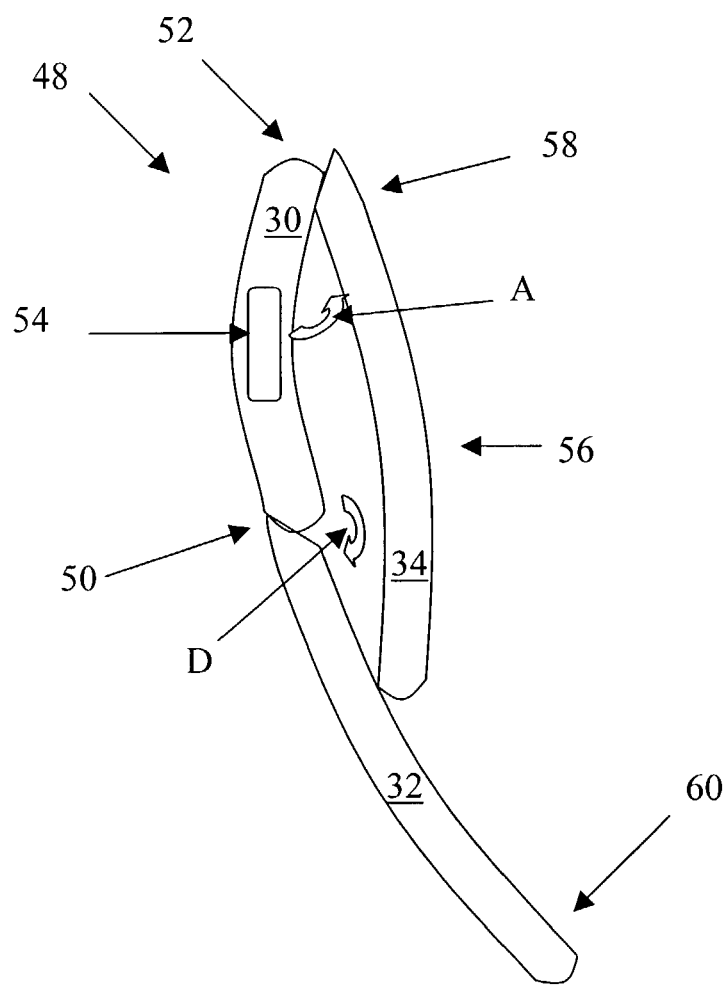
FIG. 10 illustrates the system of FIG. 9 in another position.

In FIGS. 9 and 10 illustrate a specific, preferred three-part system for use as a mobile telephone 48. This system has the part 30, the part 32, and the part 34 connected by the first and second hinges, 52 and 50, as seen in FIG. 8.

The present mobile telephone 48 has a loudspeaker 58 positioned in the part 34 and a microphone 60 positioned in the part 32. The second part 30 has a release button 54 adapted to release both springs 16 in the hinges 50 and 52.

The first part 34 preferably also has a display (not illustrated) and keyboard (not illustrated) as well as processor (not illustrated) etc of the telephone. The third part 32 has a battery (not illustrated), and flex prints (not illustrated) are provided across the hinges in order to bring power and information between the parts 32 and 34.

The direction of the springs 16 and 44 are defined to get the following operation of the telephone 48:

The telephone 48 is adapted to be worn around a wrist Q. When positioning the telephone 48 around the wrist, the parts 34 and 32 are slightly tightened around the wrist Q by moving them in the direction of the fat arrows X and Y.

The springs 16 in the hinges 50 and 52 are directed so that the high friction (when not loosened) is in the directions opposite to the fat arrows. In that manner, the telephone 48 will stay in place during movement of the wrist Q.

The user may then use the other hand to operate the button 54 to be able to remove the telephone 48 from the wrist. Naturally, the higher friction in the hinges 50 and 52 may be overcome by brute force so that the telephone 48 may be removed without operating the button. This may be due to urgency or if the telephone 48 by accident engages a foreign object (a fence or the like).

When operating the release button 54, the biasing springs are directed so that the telephone 48 obtains the position illustrated in FIG. 10. In this position, the microphone 60 and the loudspeaker 58 are positioned so that they may be used for telephone conversations.

Thus, it is seen that the hinges 50 and 52 are not merely mirrored. The hinge 50 has a biasing spring operating in the high friction direction of the spring 16, whereas the hinge 52 has a biasing spring operating in the low friction direction of its spring 16.

For the hinge 50, it is preferred that the biasing spring provides a biasing force large enough to overcome a force required to overcome the third, lower friction of the hinge, As soon as the button 54 is not operated, the biasing force should not exceed that required to overcome the higher friction of the hinge so that the part 32 may now be rotated in the direction opposite to the arrow Y—and it will stay in any given position where the user wishes it.

In the hinge 52, the situation is different in that the biasing spring operates in the direction of the low friction direction. Thus, the operation of the button 54 is not relevant in the action of rotating the third part 54 in the direction of the fat arrow X. However, when putting the telephone 48 back on the wrist Q, the button 54 needs to be operated in order to rotate the part 34 opposite to the arrow X.

After operating the telephone, it is again positioned around the wrist Q. This requires that the button 54 is again operated in order to rotate the part 34 opposite to the arrow X. When the telephone is positioned around the wrist Q, the button 54 is disengaged and the parts 32 and 34 may be further tightened against the wrist Q by simply pressing the parts 32 and 34 together. This movement is in the directions of the arrows X and Y and therefore required no operation of the button 54.

In FIG. 10, it is seen that the first part 34 should be able to rotate at least between a lowest angle A and a highest angle B, and that the second part 32 should be able to rotate at least between a lowest angle C and a highest angle D. In FIG. 10 is also shown a display 56 located in the first part 34.

FIGS. 11-14 illustrate a different embodiment of a mobile telephone again having the first part, the second part, and the third part, 34, 30, and 32, respectively. Also, the microphone 60 and the loudspeaker 58 are illustrated as well as the release button 54.

The hinges between the first, second, and third parts have not been illustrated in order to keep the figures simple.

The transport position of the telephone is seen in FIG. 11 where the telephone is as compacted as possible by having the parts 30, 32, and 34 adjacent to each other.

The hinges are of the type described above and are directed so that the second direction of rotation is away from the position of FIG. 11 to that illustrated in FIG. 12, which is the operative position of the telephone. The biasing means of the hinges are adapted to rotate the parts 32 and 34 from the position of FIG. 11 to that of FIG. 12.

Thus, operation of the button 54 will bring the telephone from any position to that of FIG. 12, whereby the microphone and loudspeaker are available for making telephone conversation.

Also, due to the operation of the hinges, other positions may be obtained, such as those illustrated in FIGS. 13 and 14 which may be desired in order to be able to e.g. see a display of the telephone, the display being positioned in one of the parts 30 or 32.

What is claimed is:

1. A mobile terminal comprising a first, a second, and a third part, a first hinge pivotally interconnecting the first and second parts, and a second hinge pivotally interconnecting the second and third parts, each of the first and second hinges comprising:
   a helical spring having a longitudinal axis, the spring comprising one or more wound strands of material, each strand having two ends,
   a first hinge part extending into the helical spring, contacting an inner part of the helical spring at a first position or area along the longitudinal axis, and
   a second hinge part contacting the one or more strands of the helical spring at a position or area different from the first position or area, in each hinge, the spring facilitating, that:
   rotation of the first hinge part in a first direction around the longitudinal axis and in relation to the second hinge part will provide a first, lower friction between the first hinge part and the helical spring, and
   rotation of the first hinge part in a second direction, being opposite to the first direction, around the longitudinal axis and in relation to the second hinge part, will provide a second, higher friction between the first hinge part and the helical spring, wherein:
   in the first hinge, the first hinge part is connected to or attached to one of the first or the second part of the terminal and the second hinge part is connected to or attached to the other of the first and the second part of the terminal,
   in the second hinge, the first hinge part is connected to or attached to one of the second or the third part of the terminal and the second hinge part is connected to or attached to the other of the second and the third part of the terminal, and the terminal further comprises, for each hinge, release means for increasing a diameter of the helical spring at the first position or area in order to reduce the second, higher friction between the first hinge part and the helical spring to a third friction during rotation of the first hinge part in the second direction.

2. A mobileterminal according to claim 1, wherein at least one of the first and second hinges comprise a biasing means for providing a rotation of the first hinge part in the second direction when the release means are operated, the biasing means being adapted to provide a force exceeding a force required to overcome the third friction but being lower than a force required to overcome the second friction.

3. A mobile terminal according to claims 1 or 2, wherein:
the first hinge part of the first hinge is connected to or attached to the first part of the terminal,
the first hinge part of the second hinge is connected to or attached to the third part of the terminal, and
the release means of the first and second hinges are positioned in the second part of the terminal.

4. A mobile terminal according to claim 3, wherein the release means are adapted to be operated by a single operating means.

5. A mobile terminal according to claim 1, the terminal further comprising locking means for maintaining the parts in a predetermined rotational angle even when the release means are operated.

6. A mobile terminal according to claim 1, wherein one of the first, second, and third parts has a sound producer and wherein one of the first, second, and third parts has a microphone.

7. A mobile terminal according to claim 6, wherein both the first and the second hinges comprising biasing means for biasing the first and the third parts of the terminal toward predetermined rotational positions, respectively, in relation to the second part of the terminal, and wherein the sound producer and the microphone are accessible at a predetermined side of the terminal when the first and third parts of the terminal are in the predetermined rotational positions in relation to the second part of the terminal.

8. A mobile terminal comprising:
a first, a second, and a third part,
a first hinge pivotally interconnecting the first and second parts so that the first and second parts are adapted to be rotated between a first, lower angle between the first and second part and a second, higher angle, and
a second hinge pivotally interconnecting the second and third parts so that the second and third parts are adapted to be rotated between a third, lower angle between the second and third part and a fourth, higher angle, wherein:
one of the first, second, or third parts of the terminal has a microphone,
one of the first, second, or third parts of the terminal has a sound emitter, and
the terminal has an operative position wherein:
the first part is rotated to the first, lower angle,
the third part is rotated to the fourth, higher angle, and
the microphone and sound emitter are accessible from a predetermined side of the terminal; and
wherein:
the first hinge has a biasing means adapted to bias the first part, relative to the second part, in a direction from the second higher angle toward the first, lower angle, and the second hinge has a biasing means adapted to bias the third part, relative to the second part, in a direction from the third lower angle toward the fourth, higher angle, the terminal further comprising releasable means for maintaining the first and third parts, relative to the second part, in at least one position rotated at an angle to the first and fourth angles, respectively.

9. A mobile terminal according to claim 8, wherein a largest, combined length of the first, second, and third parts exceeds half the circumference of a wrist of a user of the terminal and wherein the terminal, in the operative position, has a largest linear length being lower than the largest, combined length.

10. A mobile terminal according to claim 8 or 9, wherein;
the first, lower angle is lower than 45 degrees,
the second, higher angle exceeds 90 degrees,
the third, lower angle is lower than 110 degrees, and
the fourth, higher angle exceeds 110 degrees.

11. A mobile terminal according to claim 8, wherein the microphone is positioned in the third part, and wherein the sound emitter is positioned in the first part.

12. A mobile terminal according to claim 8, wherein each of the first and second hinges comprises:
a helical spring having a longitudinal axis, the spring comprising one or more wound strands of material, each strand having two ends,
a first hinge part extending into the helical spring, contacting an inner part of the helical spring at a first position or area along the longitudinal axis, and
a second hinge part contacting the one or more strands of the helical spring at a position or area different from the first area or position, in each hinge, the spring facilitating, that:
rotation of the first hinge part in a first direction around the longitudinal axis and in relation to the second hinge part will provide a first, lower friction between the first hinge part and the helical spring, and
rotation of the first hinge part in a second direction, being opposite to the first direction, around the longitudinal axis and in relation to the second hinge part will provide a second, higher friction between the first hinge part and the helical spring, wherein:
the releasable maintaining means comprise, for each hinge, release means for increasing a diameter of the helical spring at the first position or area in order to reduce the second, higher friction between the first hinge part and the helical spring to a third friction during rotation of the first hinge part in the second direction, in the first hinge:
the first hinge part being connected to or attached to one of the first or the second part of the terminal and the second hinge part being connected to or attached to the other of the first and the second part of the terminal,
the helical spring being adapted to have a rotation in the second direction to be a rotation from the first, lower angel to the second, higher angle, and
the biasing means being adapted to provide a force exceeding the first, lower friction, and
in the second hinge:
the first hinge part being connected to or attached to one of the second or the third part of the terminal and the second hinge part being connected to or attached to the other of the second and the third part of the terminal, the helical spring being adapted to have a rotation in the second direction be a rotation from the third, lower angle to the fourth, higher angle, and the biasing means being adapted to provide a force exceeding the third friction but being smaller than a force required to overcome the second friction.

13. A method of operating the mobile terminal according to claim 8, the method comprising, in sequence:

a. activating the maintaining means so as to have the biasing means rotate the first and third parts in relation to the second part for the terminal into the operative position, b. operating the terminal, c. while activating the maintaining means, positioning the three parts of the terminal around a wrist of a person.

14. A method according to claim 13, wherein step "a" comprises, while activating the maintaining means, removing the terminal from the person's wrist.

15. A method according to claim 13 or 14, the method comprising, subsequent to step "c", releasing the maintaining means and tightening the first and third parts around the wrist.

* * * * *